(12) United States Patent
Del Toro et al.

(10) Patent No.: US 10,320,440 B2
(45) Date of Patent: *Jun. 11, 2019

(54) CO-MOLDED MULTI-LAYERED PROTECTIVE CASE FOR MOBILE DEVICE

(71) Applicant: INCIPIO, LLC, Irvine, CA (US)

(72) Inventors: Carlos Del Toro, Whittier, CA (US); Timothy Jou, Irvine, CA (US); Timothy Hemesath, Clovis, CA (US)

(73) Assignee: Incipio, LLC, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/918,952

(22) Filed: Mar. 12, 2018

(65) Prior Publication Data

US 2018/0205411 A1 Jul. 19, 2018

Related U.S. Application Data

(63) Continuation of application No. 14/987,733, filed on Jan. 4, 2016, now Pat. No. 9,929,764.

(60) Provisional application No. 62/134,560, filed on Mar. 17, 2015, provisional application No. 62/100,059, filed on Jan. 5, 2015.

(51) Int. Cl.
| | |
|---|---|
| *G06F 15/00* | (2006.01) |
| *H04B 1/3888* | (2015.01) |
| *B29C 45/16* | (2006.01) |
| *B29L 31/34* | (2006.01) |
| *A45C 11/00* | (2006.01) |

(52) U.S. Cl.
CPC ...... *H04B 1/3888* (2013.01); *A45C 2011/002* (2013.01); *B29C 45/1676* (2013.01); *B29L 2031/3481* (2013.01)

(58) Field of Classification Search
CPC ............. H04B 1/3888; A45C 2011/002; B29L 2031/3481; B29C 45/1676
USPC ...... 455/575.1, 575.3, 575.8; 428/132, 304.4
See application file for complete search history.

(56) References Cited

U.S. PATENT DOCUMENTS

| | | |
|---|---|---|
| 9,521,220 B2 | 12/2016 | Gandhi et al. |
| 9,853,674 B2 | 12/2017 | Gandhi et al. |

(Continued)

OTHER PUBLICATIONS

Incipio Highwire Dual Injected Protective Case for iPhone 6/6s, printed from web Feb. 24, 2016, http://www.incipio.com/cases/iphone-cases/iphone-6s-cases/highwire-durable-iphone-6-case.html.

*Primary Examiner* — Sam Bhattacharya
(74) *Attorney, Agent, or Firm* — Manatt, Phelps & Phillips, LLP

(57) ABSTRACT

A protective case for a mobile device having a multi-layered construction is disclosed. The multi-layered construction includes two layers co-molded to one another and produces a lightweight and low-profile case providing a high level of impact protection. The first layer generally forms the internal rigid shell of the case, and the second layer forms the external soft shell of the case which may include a perforated pattern of holes. The first layer is comprised of material that has a hardness greater than the second layer. The layers are configured to interact with one another so that they are capable of distributing and absorbing impact forces to mitigate damage to the mobile device. The first layer includes apertures in which the second layer forms buttons corresponding to mobile device user controls. The second layer also bonds through attachment openings at the corners of the first layer.

20 Claims, 25 Drawing Sheets

(56) References Cited

U.S. PATENT DOCUMENTS

2012/0327565 A1* 12/2012 Tages .................. B29C 45/1676
361/679.01
2015/0062787 A1    3/2015 Wilson et al.

* cited by examiner

CO-MOLDED MULTI-LAYERED PROTECTIVE CASE FOR MOBILE DEVICE

INCORPORATION BY REFERENCE TO RELATED APPLICATIONS

This application is a continuation of U.S. patent application Ser. No. 14/987,733, filed Jan. 4, 2016, which claims the benefit of priority to U.S. Provisional Application Nos. 62/100,059, filed Jan. 5, 2015 and 62/134,560, filed Mar. 17, 2015. The above-referenced applications are hereby incorporated herein by reference in their entirety and are to be considered as part of this specification.

BACKGROUND OF THE INVENTION

Field of the Invention

This patent document relates to user removable protective enclosures or cases for mobile devices and more particularly to such cases that have a unique integrated multi-layered construction.

Description of the Related Art

Mobile devices, such as smart phones, tablets, laptops and the like are known to sustain damage from impact and from contamination as a result of ingress of water or other fluid. The damage, for example, may result in a cracked screen, scratches on a finished surface, lost or damaged buttons or controls, cracked or bent external body components, and/or failed or malfunctioning electrical components. Protective cases have thus been provided to protect mobile devices from such and variant types of damage.

Often such cases include outer surfaces formed of rigid plastic materials, which on the one hand can provide desirable protection, but on the other hand can be bulky, slippery or otherwise be unappealing to the touch or grip and depending on construction can result in reduced responsiveness of buttons and other mechanical interfaces on the case. Some or all of these shortcomings can detract from the user experience.

Accordingly, it is here recognized that there is a continuing and ever increasing desire to minimize the bulk and weight of protective cases for mobile devices while maintaining a high level of protection, providing a more desirable, durable gripping surface, and incorporating more responsive buttons.

SUMMARY OF THE INVENTION

There exists a continuing need for new and improved designs for protective cases for mobile devices that provide high level of protection, yet are low profile.

Disclosed are numerous aspects of a unique and inventive protective case configured to receive, retain and protect a mobile device that includes a front face and a back face that define the height of the mobile device, a perimeter defined by side extending between the front and back face, which in the illustrated implementation includes a top-end, a bottom-end, a right side, and a left side positioned between the front face and back face, and corners defined at the intersecting regions of the sides. The case may be configured for a mobile device that is in the form of a tablet, a mobile phone, an MP3 audio player, a gaming device, or other portable handheld electronic device.

The case is generally formed of a multilayered construction that includes an inner relatively rigid support layer or shell that is wrapped or encased within a relatively less rigid and more elastic outer layer. The outer layer is comprised of a first or internal side and an opposing second or external side. The external and internal sides of the outer layer extend to the perimeter of the relatively rigid shell where they merge together around the perimeter of the shell to form a unitary component. The external and internal sides of the outer layer define inner and outer surfaces of the case, with the internal surfaces configured to face the mobile device for which the case is configured and the external surface defined to face away from the mobile device when the mobile device is received and retained within the case The relatively rigid support layer may be formed of polycarbonate, nylon fiber reinforced plastic, similarly rigid materials or a combination thereof. The relatively less rigid and more elastic outer layer or encasing may be formed of a silicone compound or the like.

The inner rigid support layer may include one or more apertures that are configured to correspond with buttons or user controls on the mobile device. The internal side and external side of outer layer or encasing may be configured to merge within the button/control apertures to form buttons in the outer layer that reside within the apertures defined in the inner rigid support layer. Some apertures in the inner rigid support layer may remain uncovered by the outer layer, for example a camera window or other mobile device controls such as switches or ports for which it may be desirable to provide direct user access. The button/control apertures are configured to permit movement of the buttons within the apertures when a user presses the buttons. Additionally, the inner side and outer side of the outer layer are configured to be supported by the perimeter of the button/control aperture in the rigid inner layer so as to effectuate a trampoline effect that is capable of generating a dynamic button response. The opposing sides of the outer layer are configured to bias the button back toward an equilibrium position in response to being displaced in either direction.

The outer layer may be perforated with one or more repeating patterns such as circular holes (or other shapes or combination of shapes) to allow visibility through the outer layer to the inner more rigid shell layer. The pattern itself may enhance aesthetic appeal and the inner rigid support layer may be formed of a different color than the outer layer to further provide contrast that may be appealable to the user. The perforated pattern in the outer layer also decreases the total weight and the amount of the material of the case as compared to an un-perforated outer layer.

The inner and outer layers are configured to surround, receive and retain the mobile device within a retention compartment defined by the inner boundaries of the case. The inner and outer layers are co-molded to one another using a dual injection molding process wherein the inner layer is molded first and then the outer layer is molded on top of the inner layer so that the outer layer extends beyond and around the outer edges of the inner layer so as to effectively encase or envelope the inner layer within the outer layer. The buttons section formed by the outer layer within the apertures of the inner layer are thus extensions of the internal and external sides of the outer layer molded to both the outside and inside surface of the inner layer and are thereby supported and attached around the perimeter to both the inside and outside surfaces (or front and back surfaces) of the inner layer.

The outer layer can be uniform in thickness in regions or throughout or have varying thickness in one or more regions.

The thickness can, for example, be thinner at the edges of the holes that form the see-through perforated pattern.

The corners of the case near the perimeter areas may be configured to include regions where the outer layer is laced or molded through attachment openings or apertures extending in or through the inner layer. For example, the corners of inner layer may include a plurality of attachment openings and a plurality of attachment connections between the inner and outer sides of the outer layer, such that the outer layer is effectively laced or molded through the attachment openings. A stronger bond may be thus formed between the inner and outer layers in those corner and perimeter regions, which may mitigate peeling of the outer layer from the inner layer in those areas and thereby provide greater durability.

The attachment openings may vary in size, shape, position, and number. For example, in one embodiment, each corner of the inner rigid layer includes two attachment openings—one circular and one oblong in shape. The mold can be configured so that the outer layer at those openings forms protrusions that function as corner bumpers. The oblong shaped attachment opening and the corner bumper corresponding to the oblong shaped attachment opening may for example be greater in dimension than the attachment openings. In another embodiment, each corner of the inner rigid layer may include three attachment openings that are generally uniform in shape and are equally spaced apart from one another. The number and size of attachment openings and the size and dimension of the outer layer bumpers formed thereon may vary from a single opening and bumper on each corner to multiple openings and/or bumpers on each corner.

Methods of manufacturing a protective case that includes one or more of the various foregoing aspects are also disclosed. Manufacturing steps may, for example, include:

(1) co-molding two distinct layers within a mold to form an integrated protective case construct.

(2) molding the first inner layer defined by first internal and external surfaces (or front and back surfaces) and dimensioned to cover at least a portion of the back face of the mobile device and extend around at least a portion of the perimeter of the mobile device at the back face boundary. The first inner layer may be further molded to include one or more control apertures dimensioned and positioned to allow access to control buttons or ports on the mobile device and one or more attachment openings positioned, for example, at the corners of the case.

(3) co-molding a second layer over the internal and external surfaces of the inner layer around the perimeter regions of the first inner layer, the second layer being defined by corresponding inner and outer walls and dimensioned to cover one or more regions of the top, bottom, right and left sides of the mobile device and regions of the back and front face of the device. The second layer may be further molded to include a pattern of holes extending therethrough that define or form an arrangement of shapes selected for example from a group consisting of a square, octagon, pentagon, rectangle, triangle, circle, hexagon, heptagon or combination thereof. The pattern of holes in the outer layer are configured to visibly expose the underlying inner layer. The outer layer may be molded through the attachment openings at the corners to provide additional durability and resistance to peeling and may be molded to form protrusions or bumpers at the corners or elsewhere on the case.

The various configuration, appearance, and construction aspects of the component layers, described above or otherwise herein (including as illustrated in the drawings) may be imparted by the molding process of the layer during one or more of the foregoing steps, or portions of any of the foregoing steps.

Each of the foregoing and various aspects, together with those set forth in the claims and summarized above or otherwise disclosed herein, including the drawings, may be combined to form claims for a device, apparatus, system, method of manufacture, and/or use without limitation.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

1, wherein each of the corners of the inner layer of the case include two attachment openings one circular and one oblong shaped. The outer layer is molded through the attachment openings to provide greater durability and resistance to peeling. The outer layer may be molded to form protrusions that extend out from the attachment openings to form bumps for added protection in that region.

Figure 1:
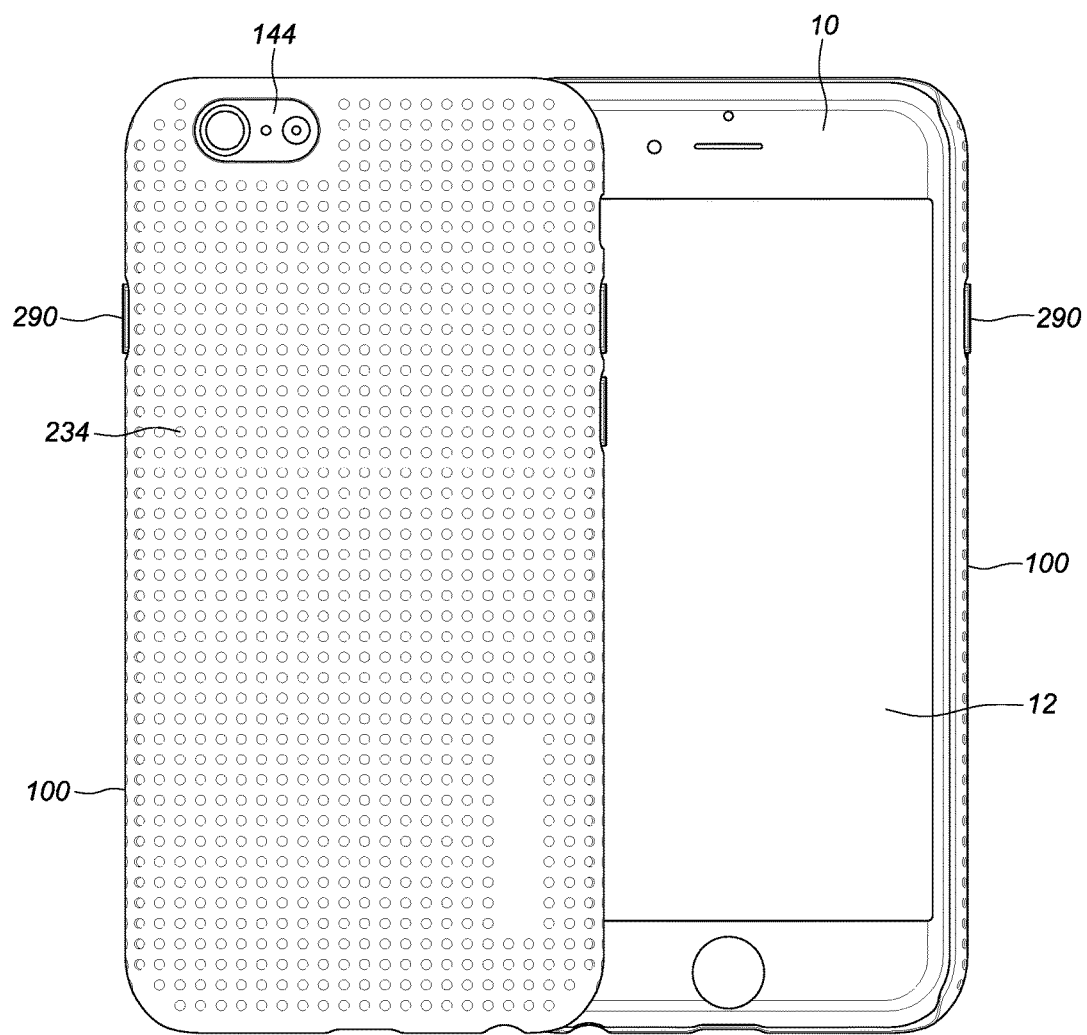
FIG. 1 illustrates the back and front of protective case for a mobile device with the mobile device received within the cases. The mobile device depicted in the illustration is a depiction of an Apple iPhone 6 mobile phone.
Figure 2A:
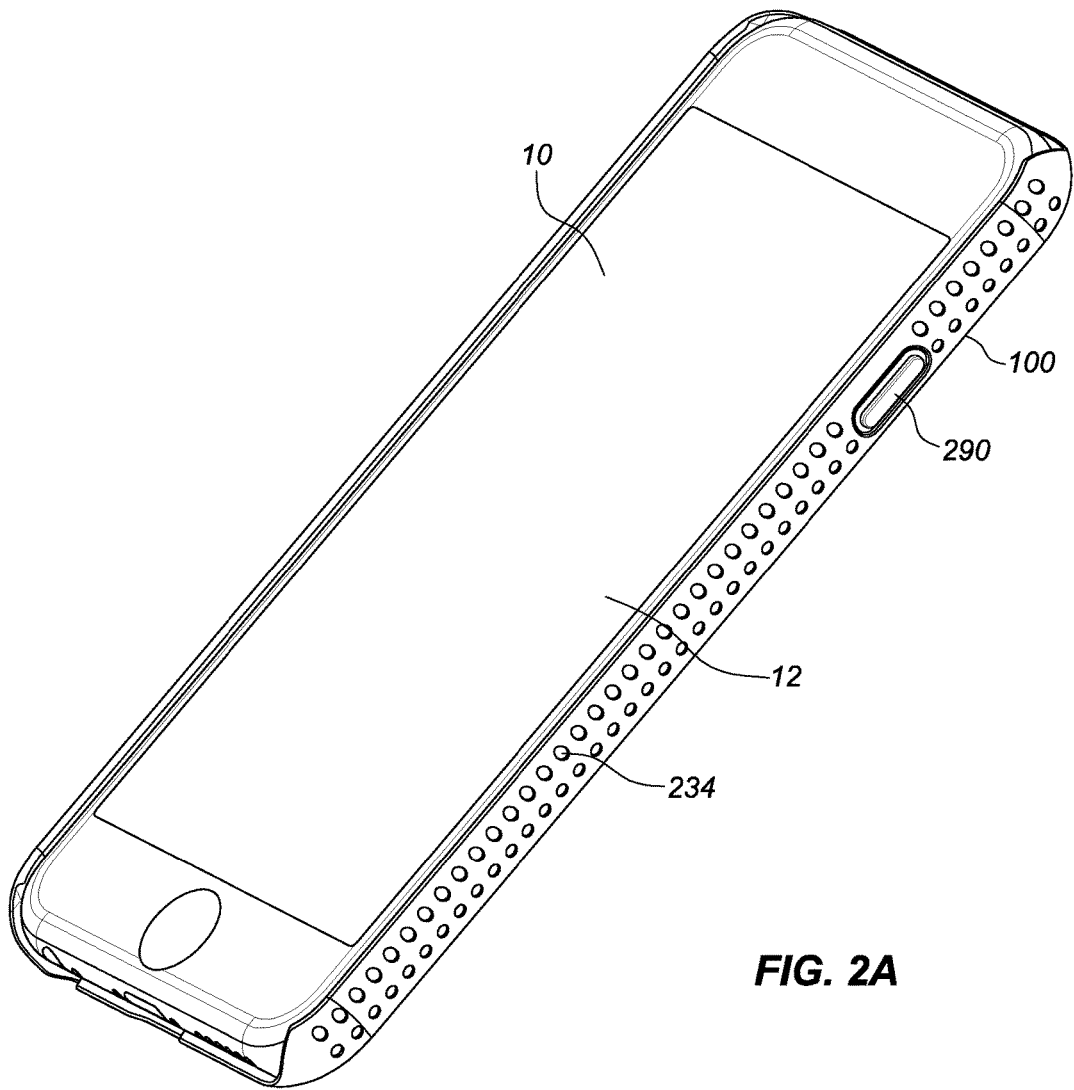
FIGS. 2A-2B are front and back face perspective views, respectively, of the protective cases illustrated in FIG. 1. The perspective views are both taken from the right side.
Figure 2B:
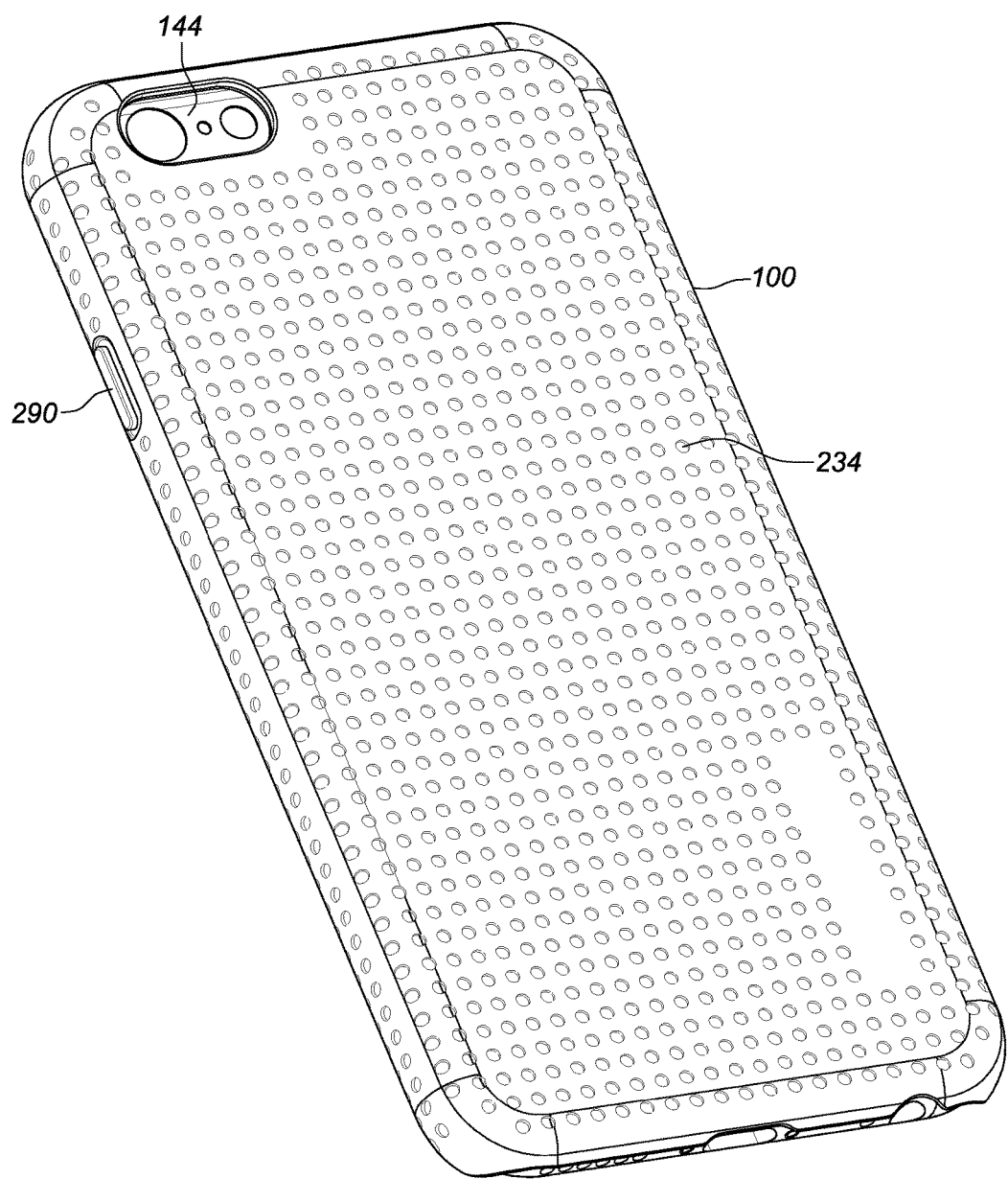
Figure 3A:
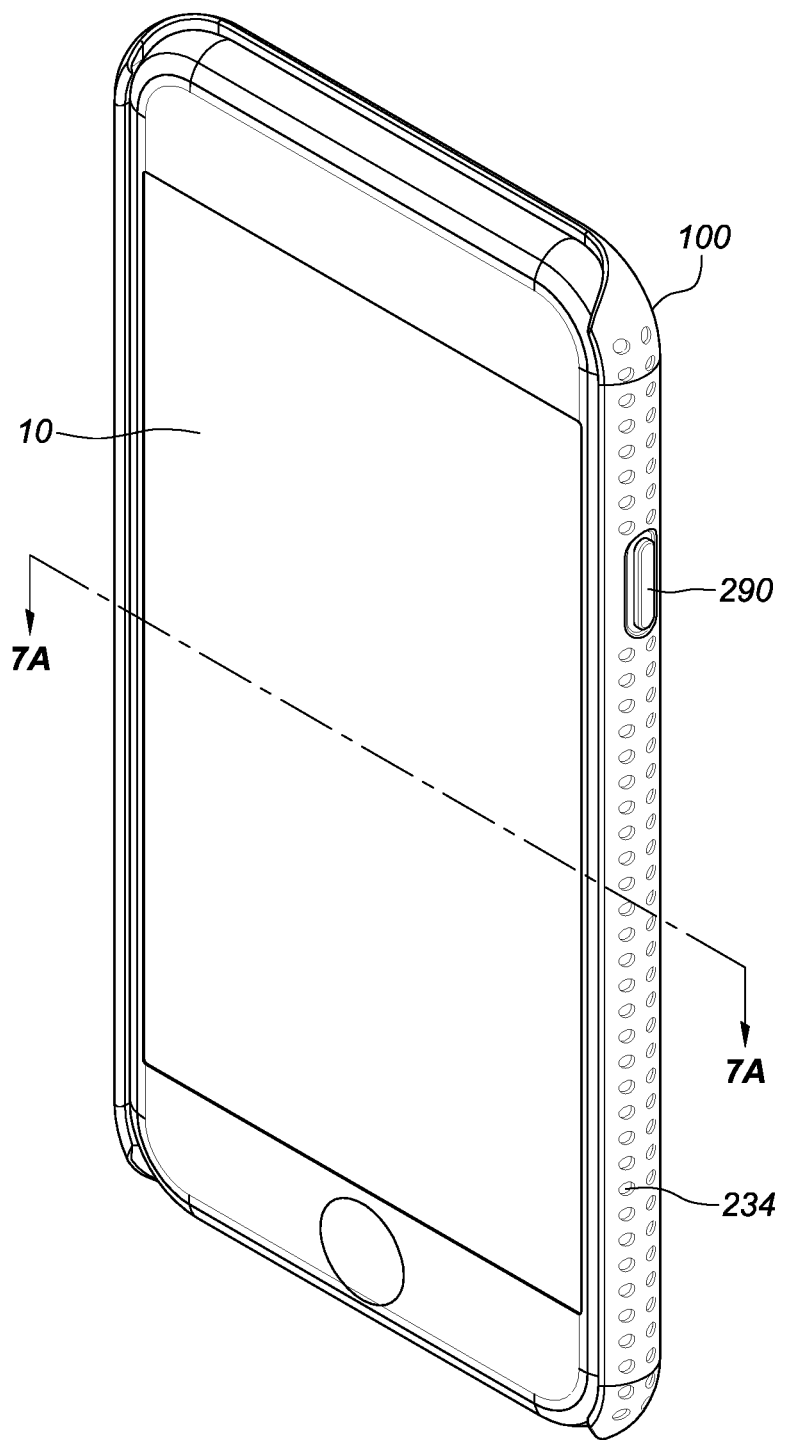
FIG. 3A is another front perspective view of the protective case with the mobile device received within the case illustrated in FIG. 2A.
Figure 3B:
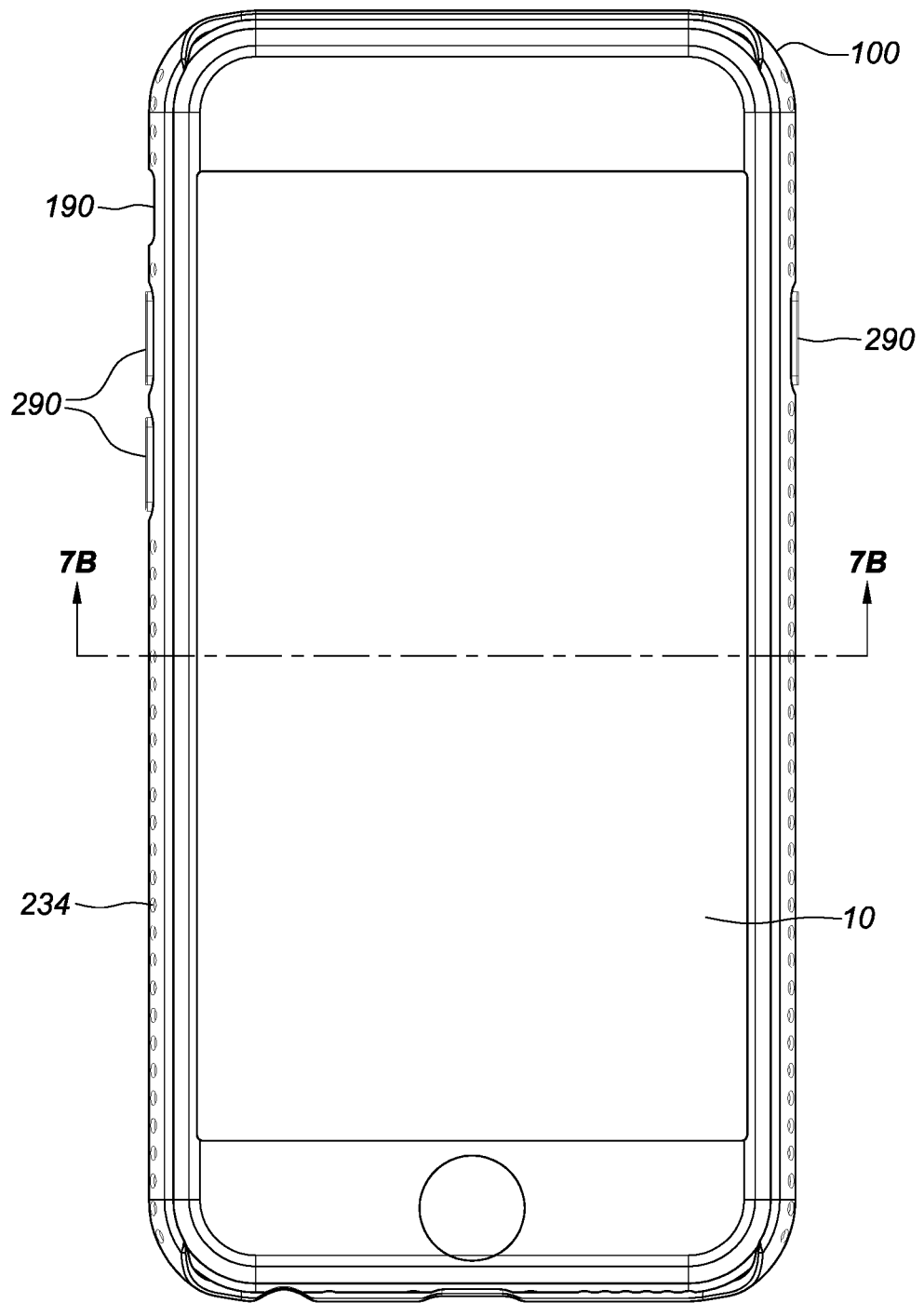
FIGS. 3B-3G are front, back, left side, right side, top side and bottom side views of a protective case for a mobile device illustrated in FIG. 3A.
Figure 3C:
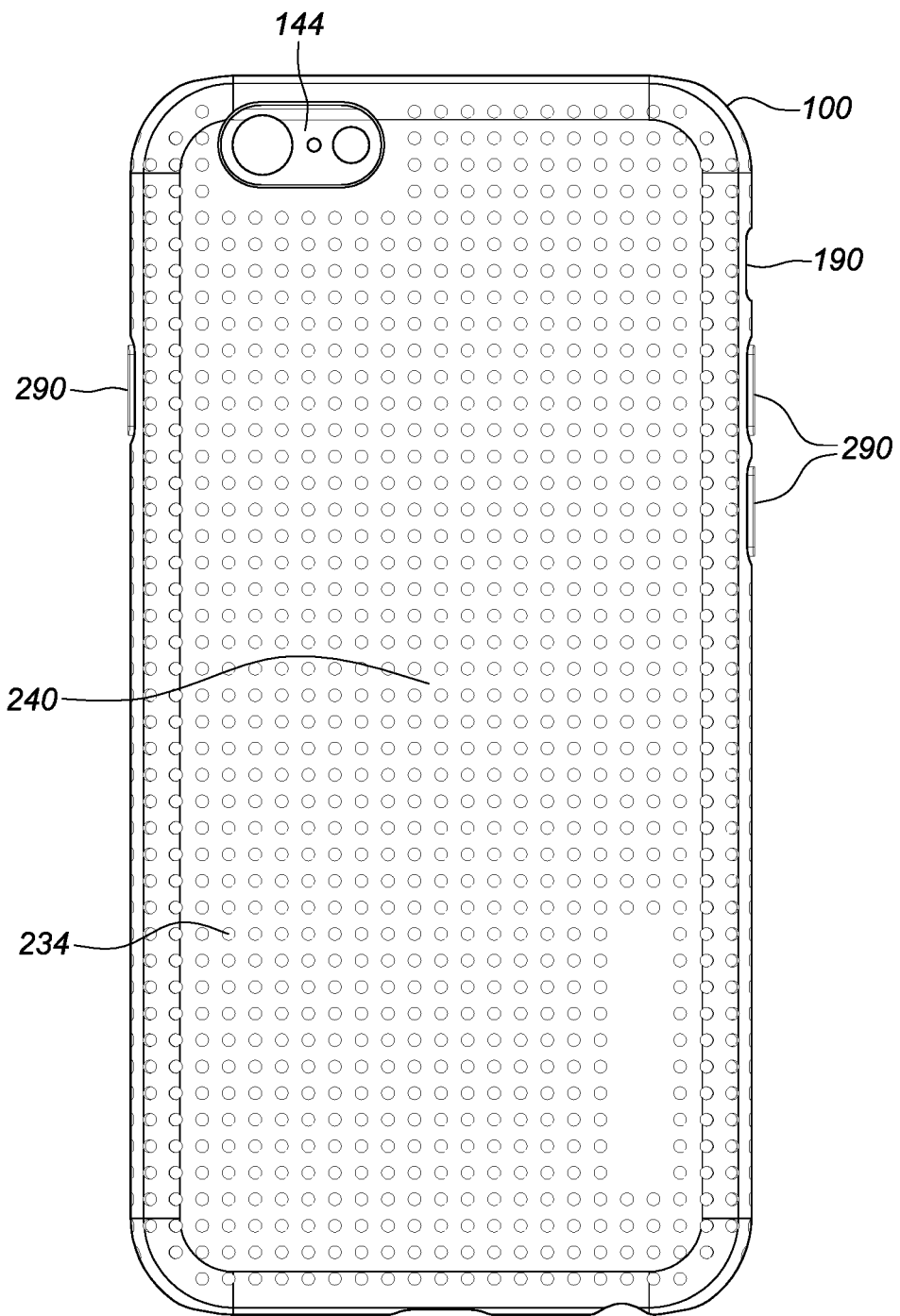
Figure 3D:
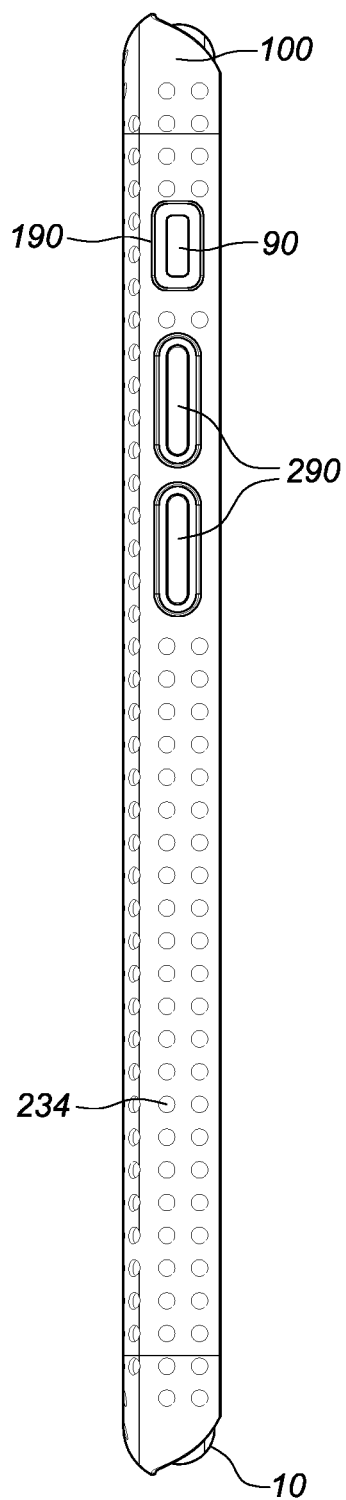
Figure 3E:
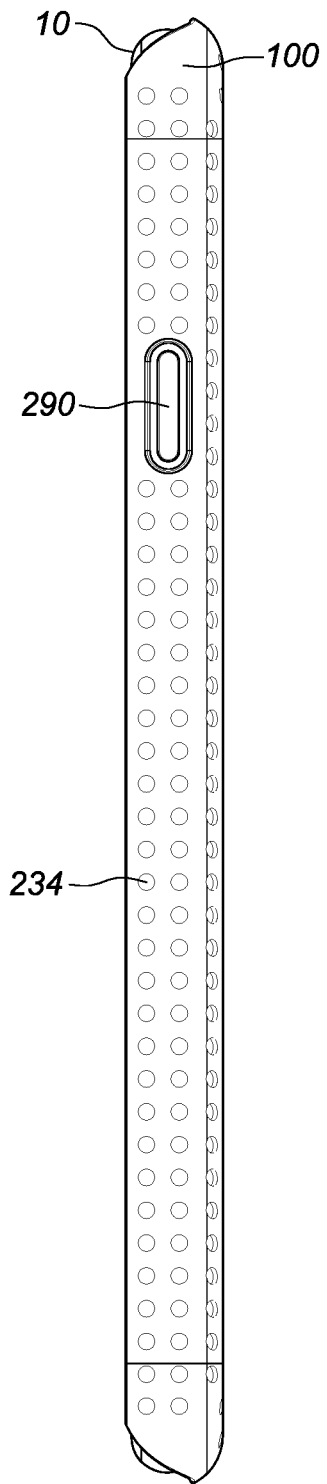
Figure 3F:
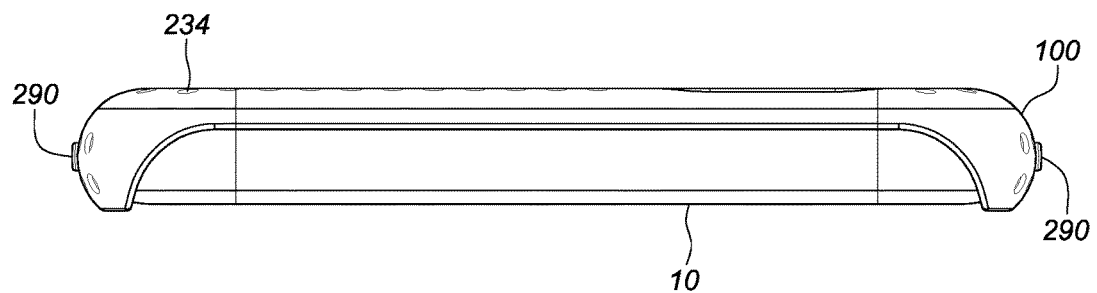
Figure 3G:
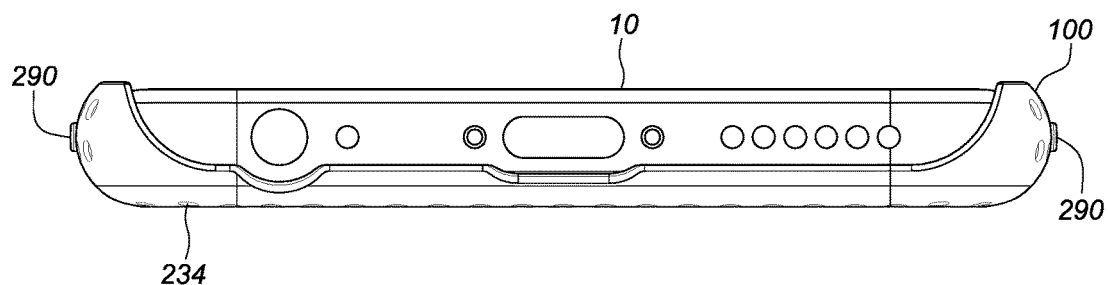
Figure 4A:
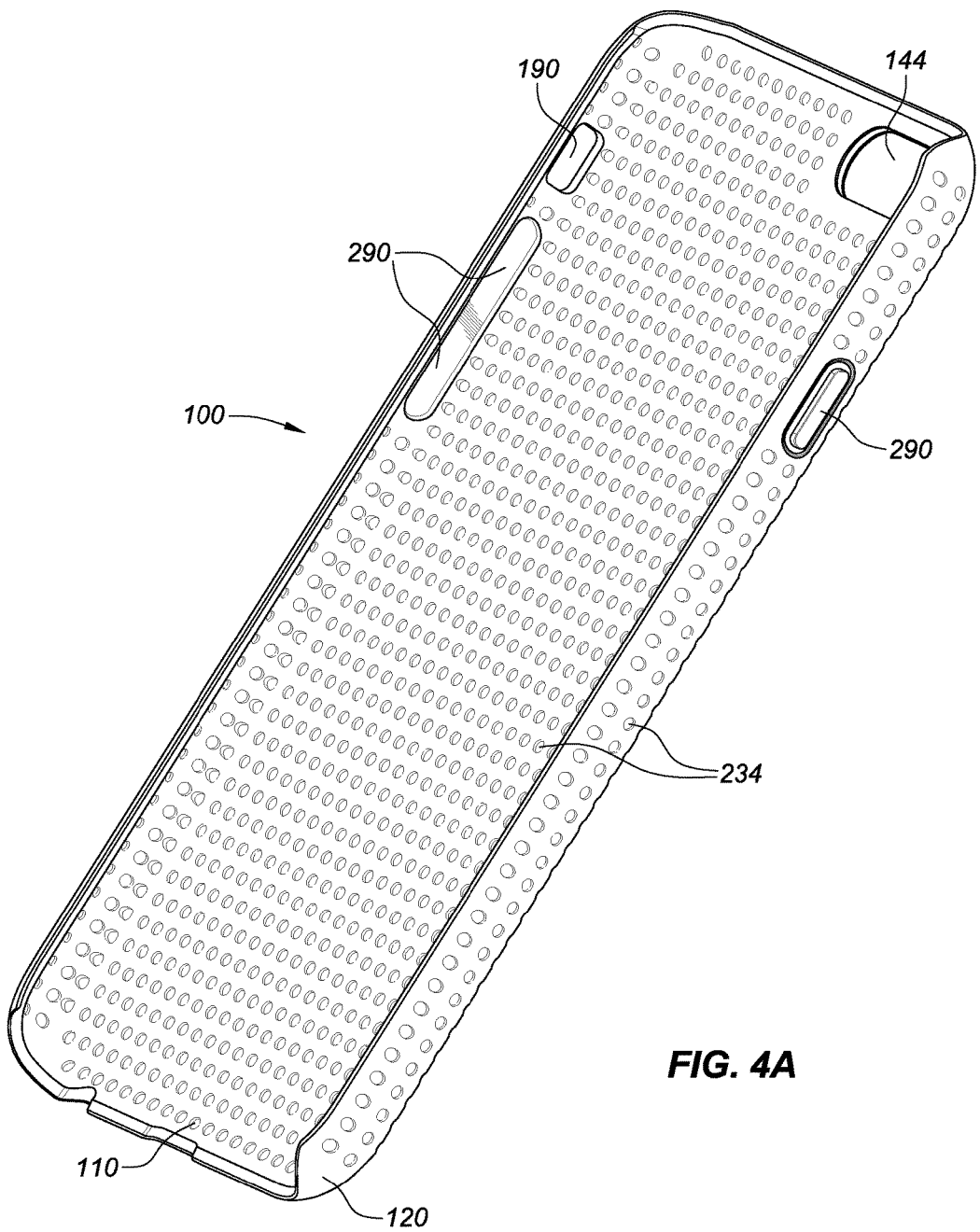
FIGS. 4A-4C are front-right, front-left and back-left perspective views, respectively, of the protective cases illustrated in FIG. 2A with the mobile device removed from the case.
Figure 4B:
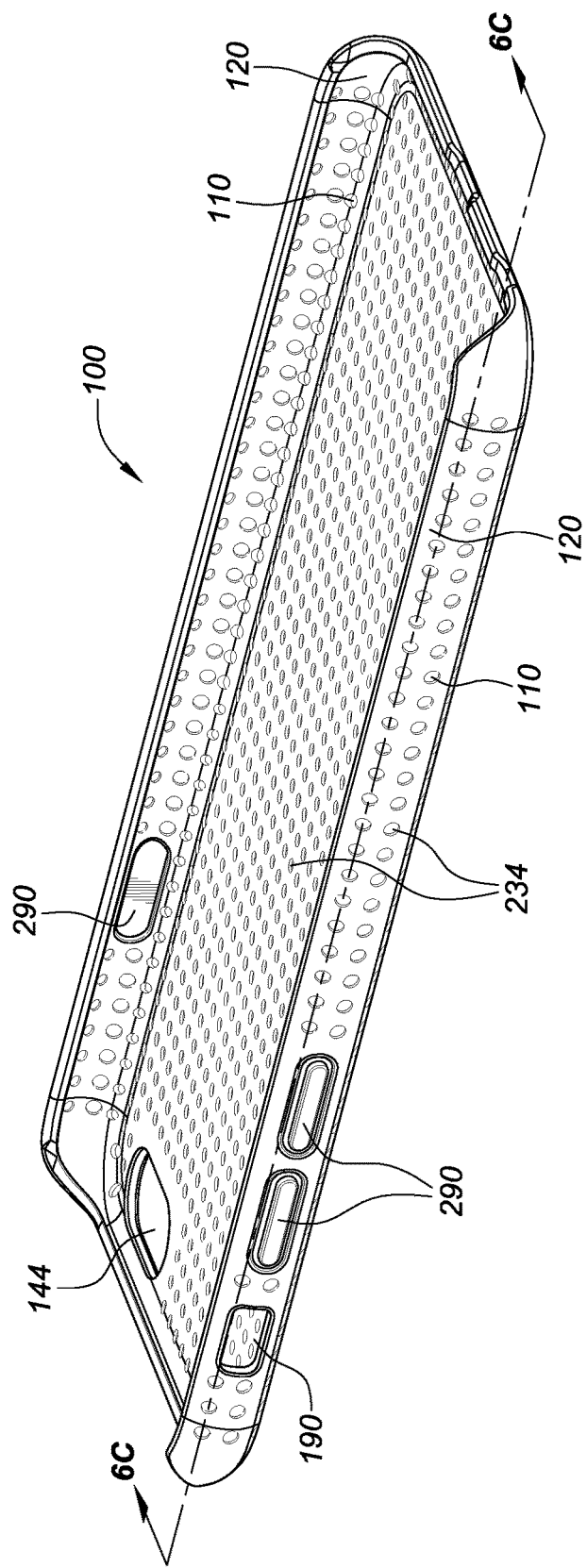
Figure 4C:
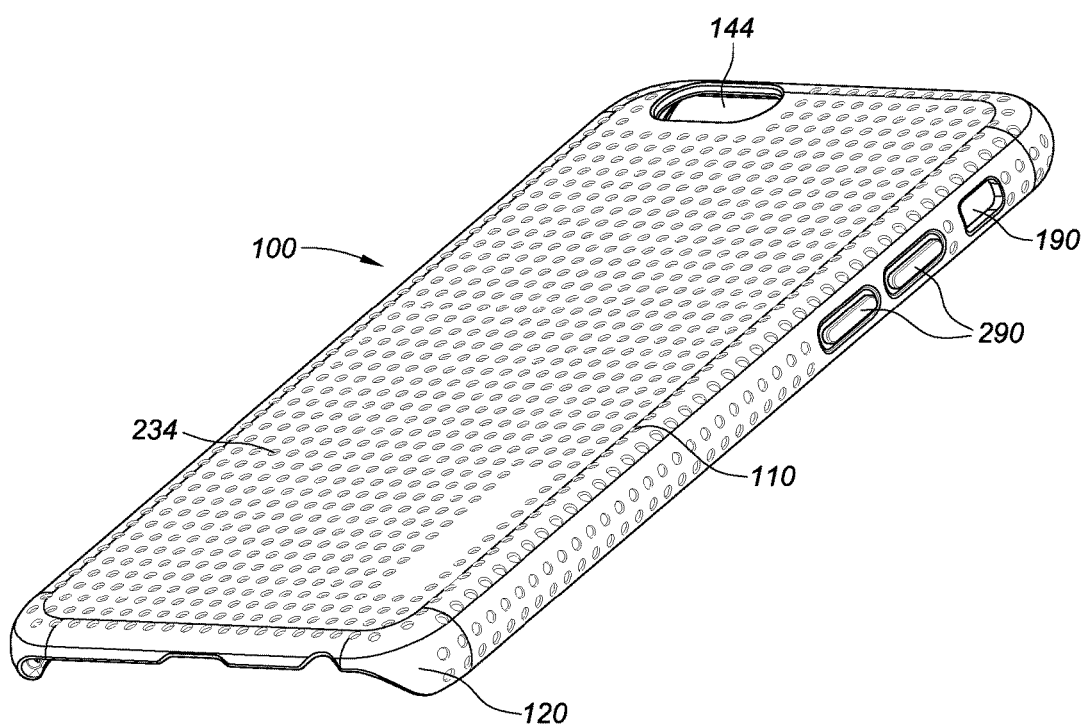
Figure 5A:
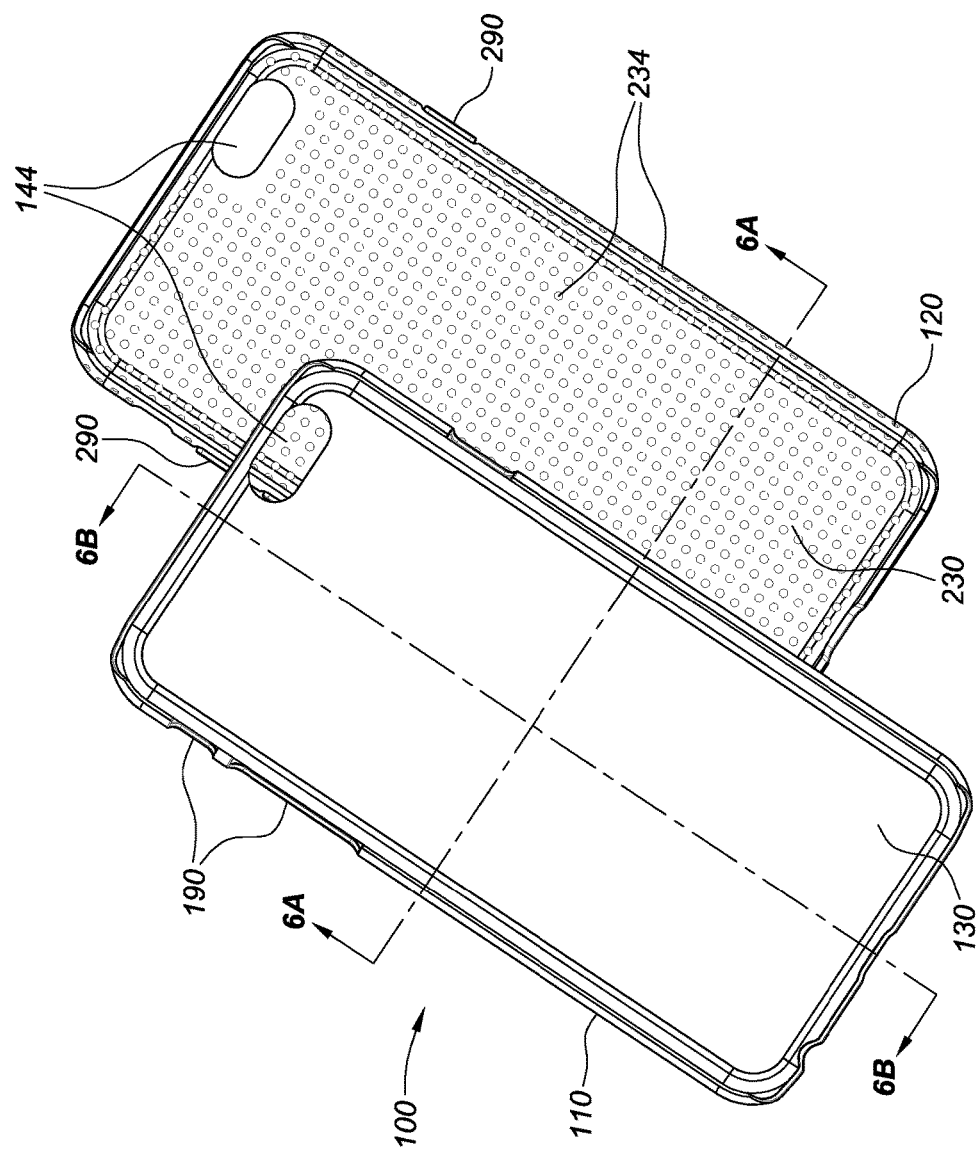
FIGS. 5A-5B are exploded views of the protective cases illustrated in FIGS. 4A-4C illustrating the inner layer removed from the co-molded outer layer encasing or sleeve.
Figure 5B:
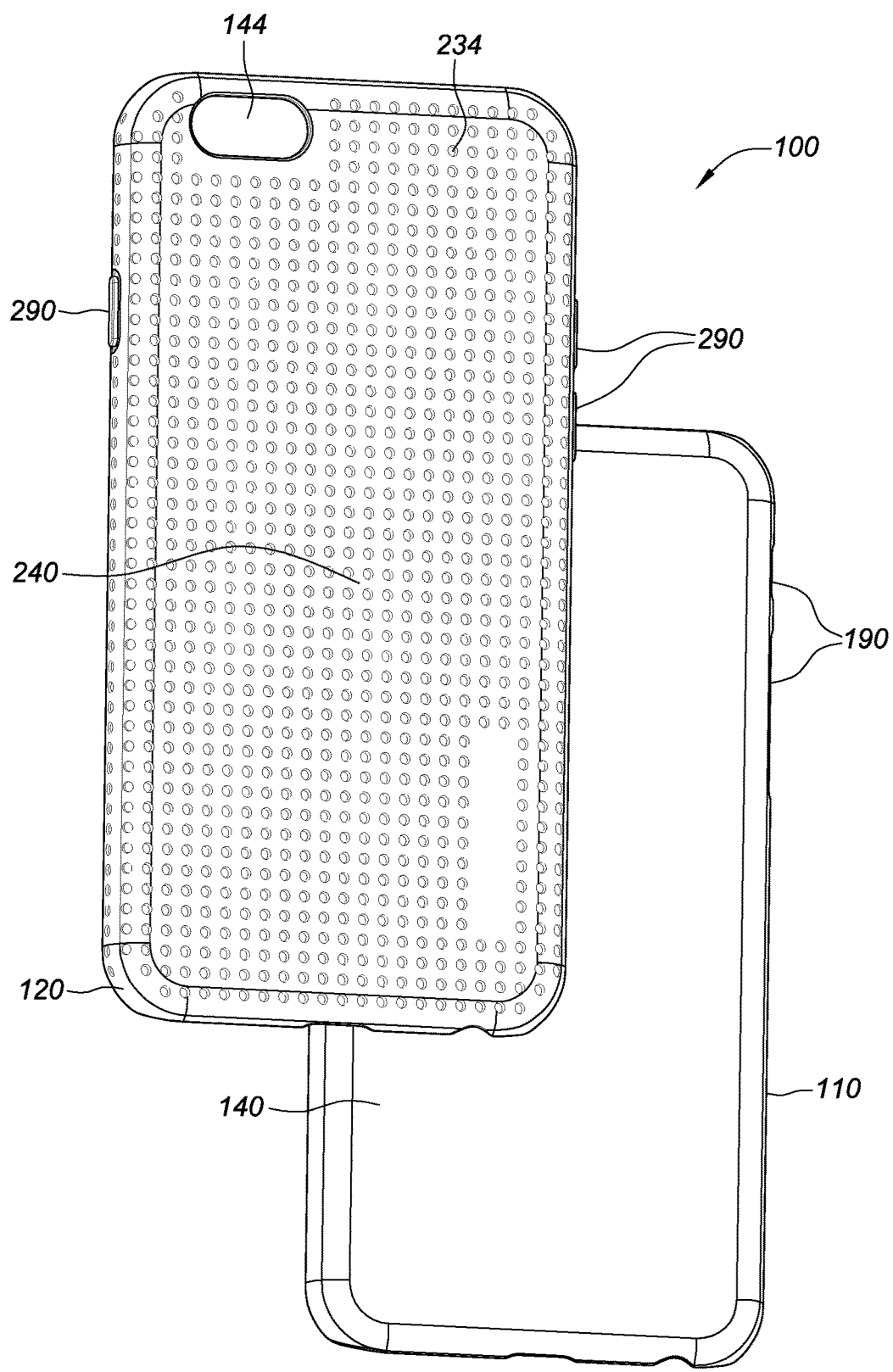
Figure 5C:
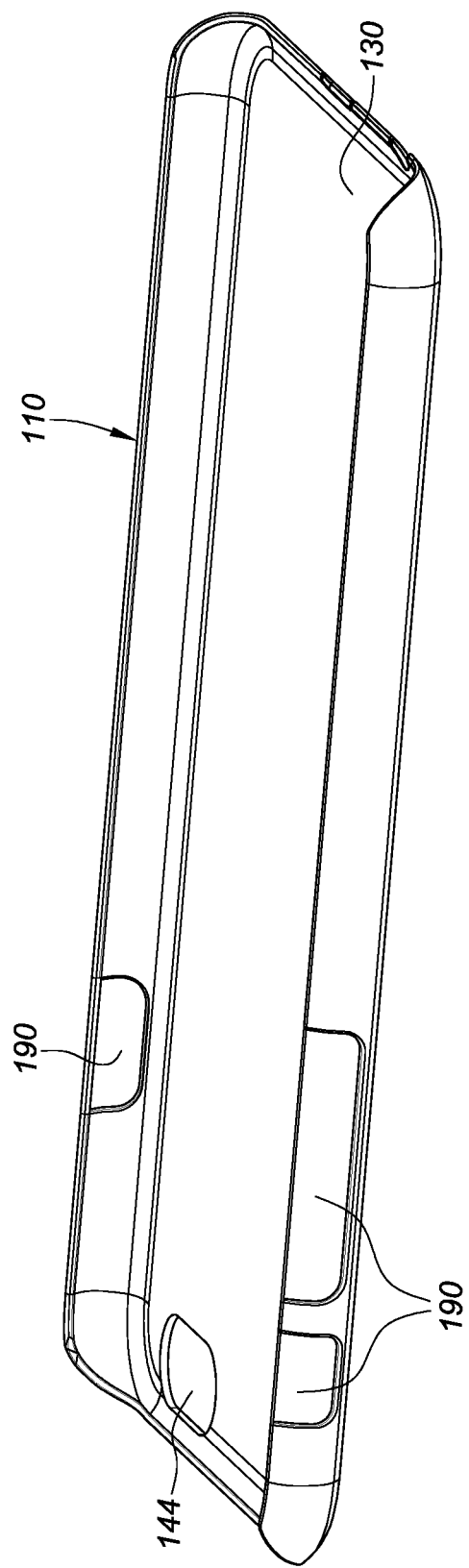
FIG. 5C is a perspective front-left perspective view of the inner layer alone.
Figure 6A:
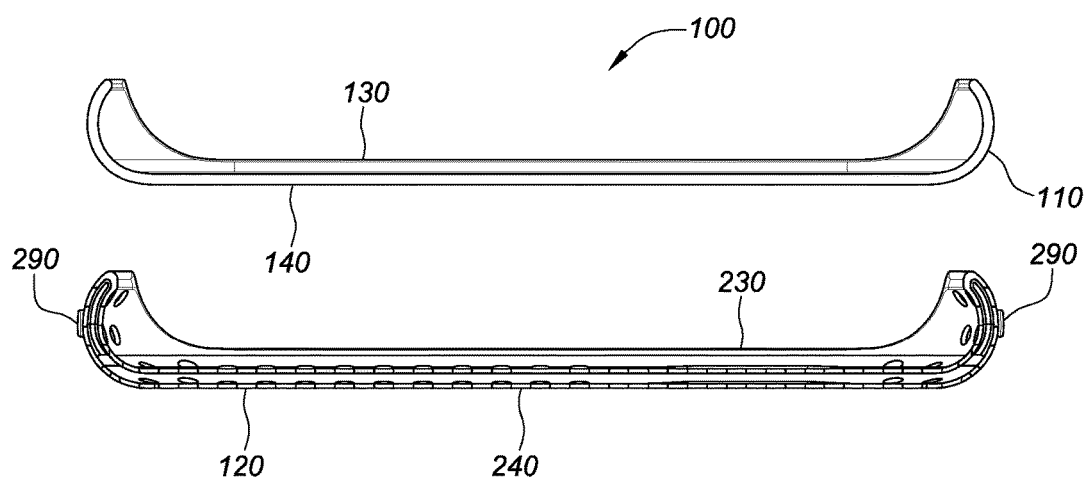
FIG. 6A is a cross-sectional view taken along plane 6A-6A of FIG. 5A showing in greater detail the construction of the inner layer of the case. To provide a side-by-side comparison, FIG. 6A also includes a cross-sectional view of the outer layer along the same plane as applied to the outer layer alone when overlaid on the inner layer.
Figure 6B:
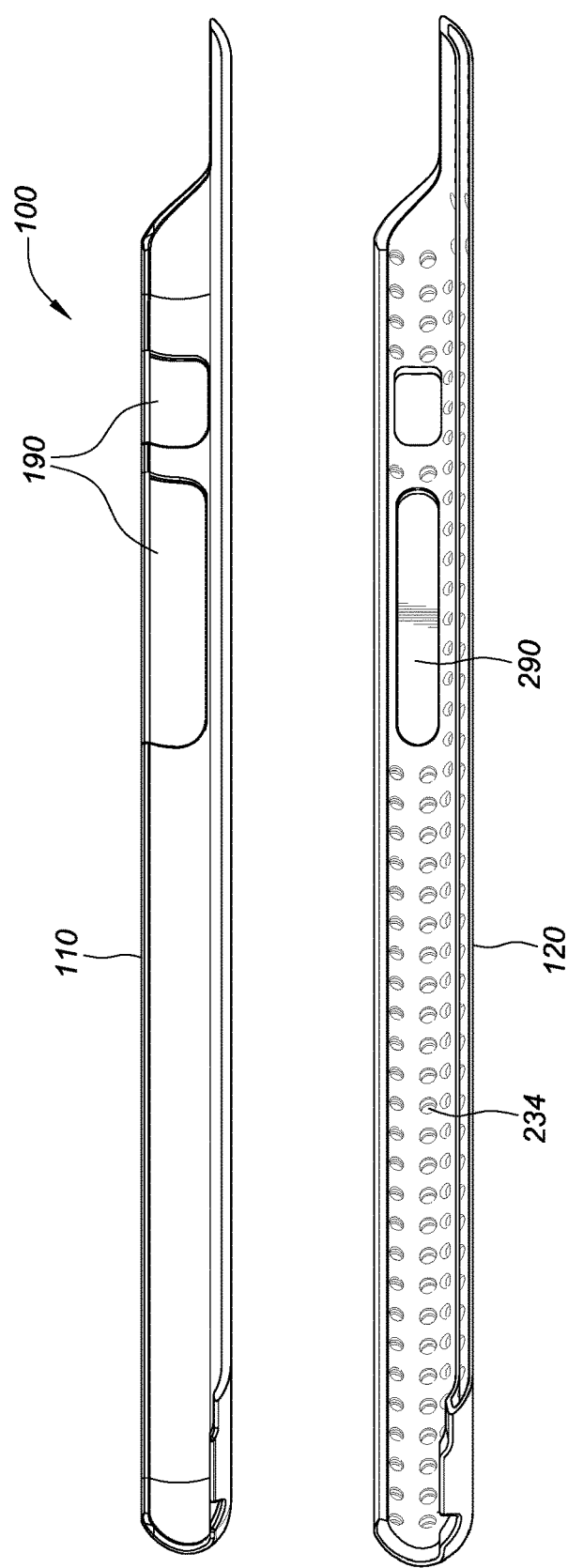
FIG. 6B is a perspective cross-sectional view taken along plane 6B-6B of FIG. 5A showing in greater detail the construction of the inner layer of the case. To provide a side-by-side comparison, FIG. 6B includes a cross-sectional view of the outer layer along the same plane as applied to the outer layer alone when overlaid on the inner layer.
Figure 6C:
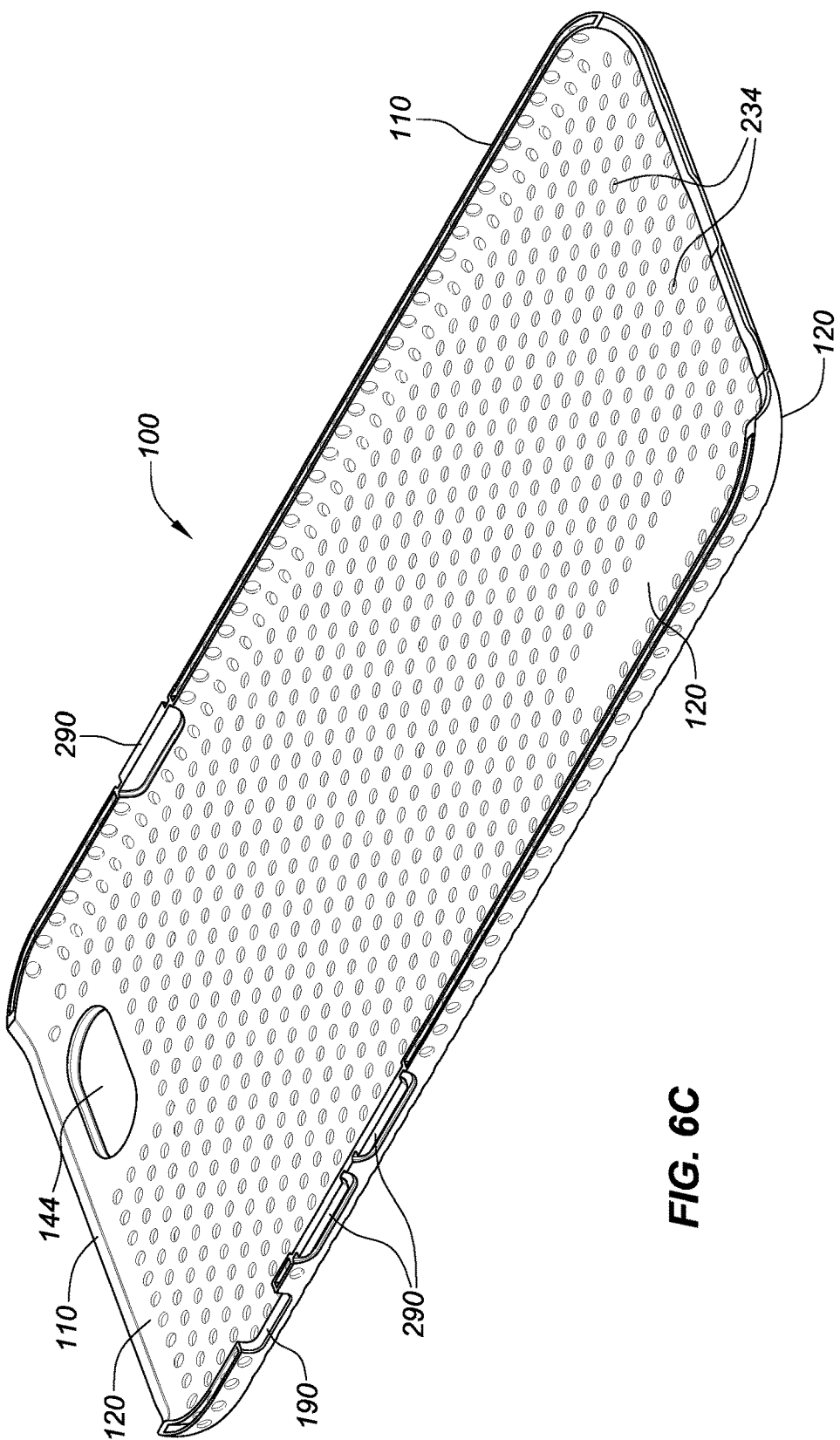
FIG. 6C is a cross-sectional view taken along plane 6C-6C of FIG. 4B showing in greater detail the construction of the inner and outer layers of the case.
Figure 6D:
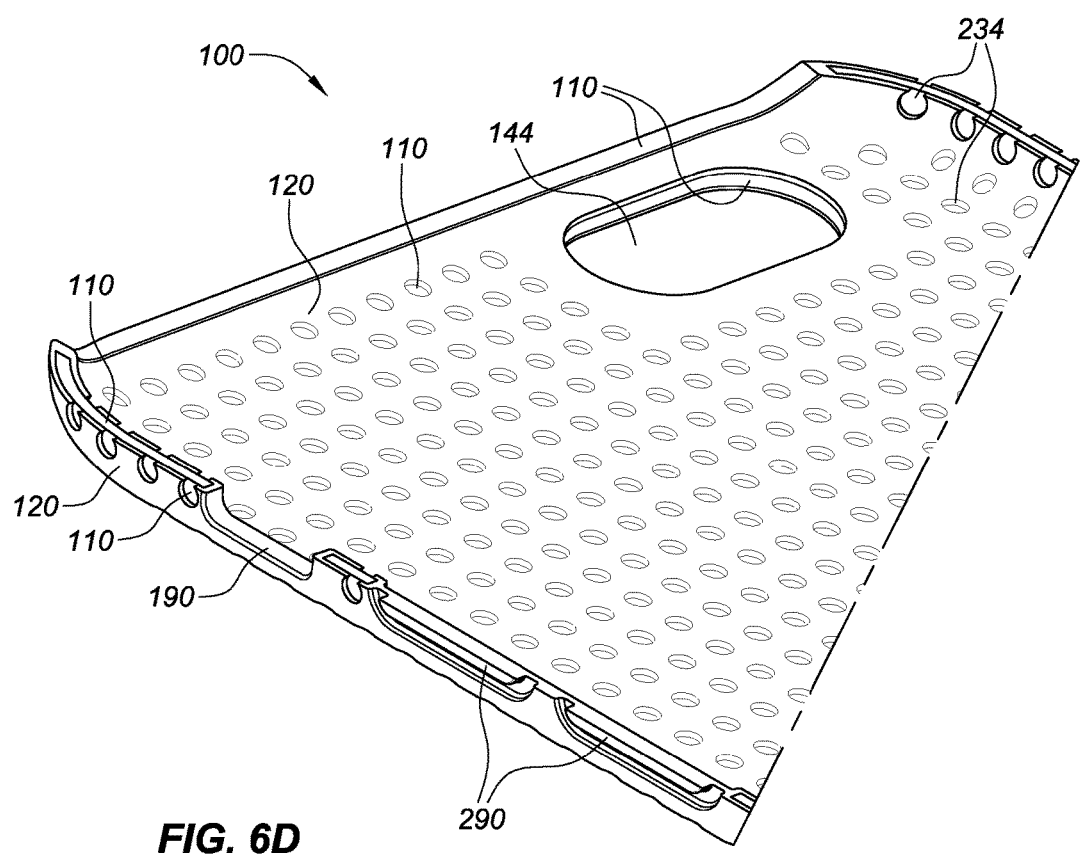
FIG. 6D is an enlarged view of the upper left side corner of the case illustrated in FIG. 6C showing in greater detail the construction of the inner and outer layers of the case and top left side of the case.
Figure 7A:
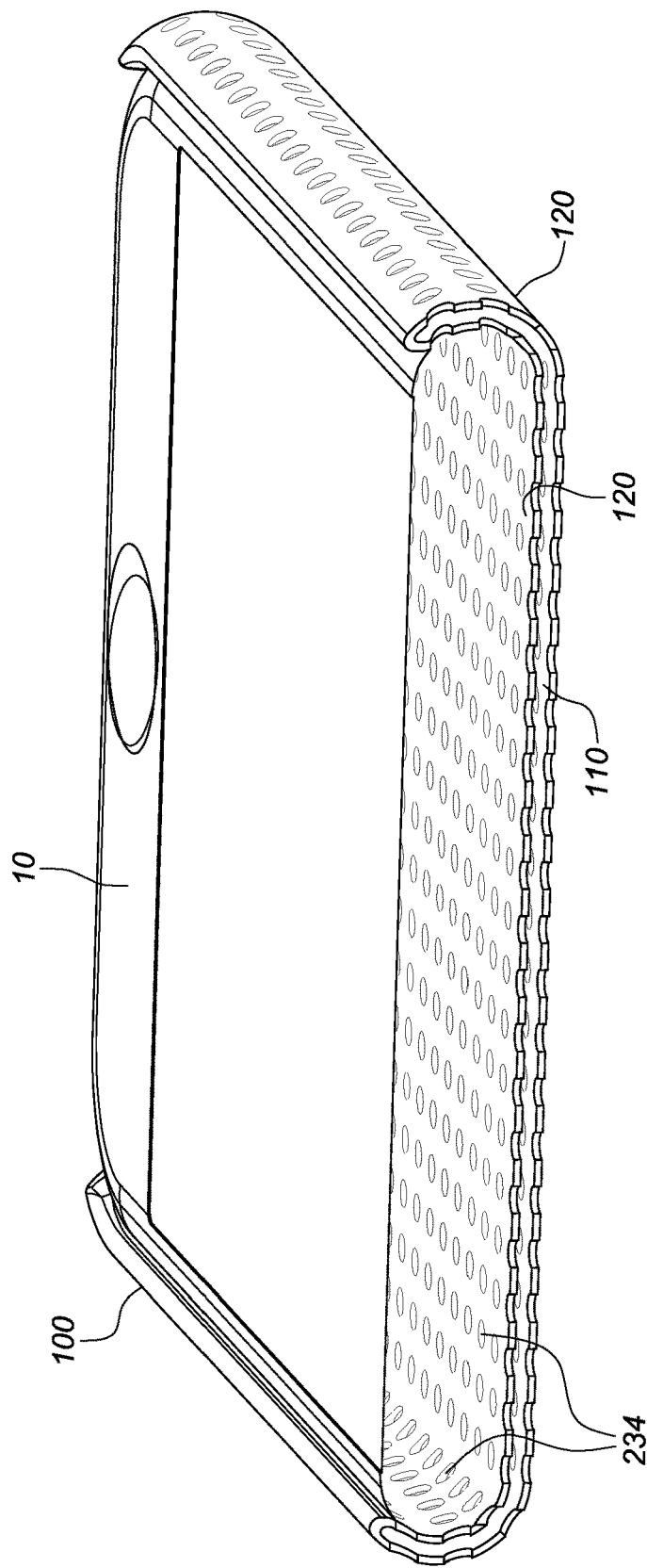
FIG. 7A is a cross-sectional view taken along plane 7A-7A of FIG. 3A showing in greater detail the construction of the case with the internal construction of the mobile device phone being removed to allow greater visibility to the case compartment.
Figure 7B:
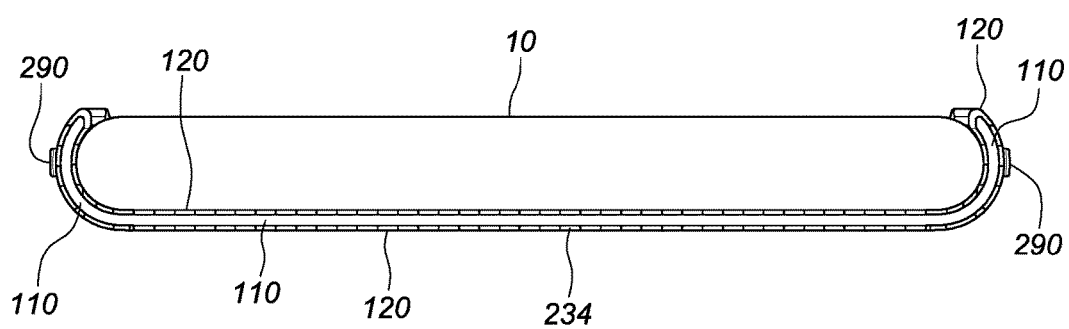
FIG. 7B is a cross-sectional view taken along plane 7B-7B of FIG. 3B showing in greater detail the construction of the inner and outer layers of the case.
Figure 9A:
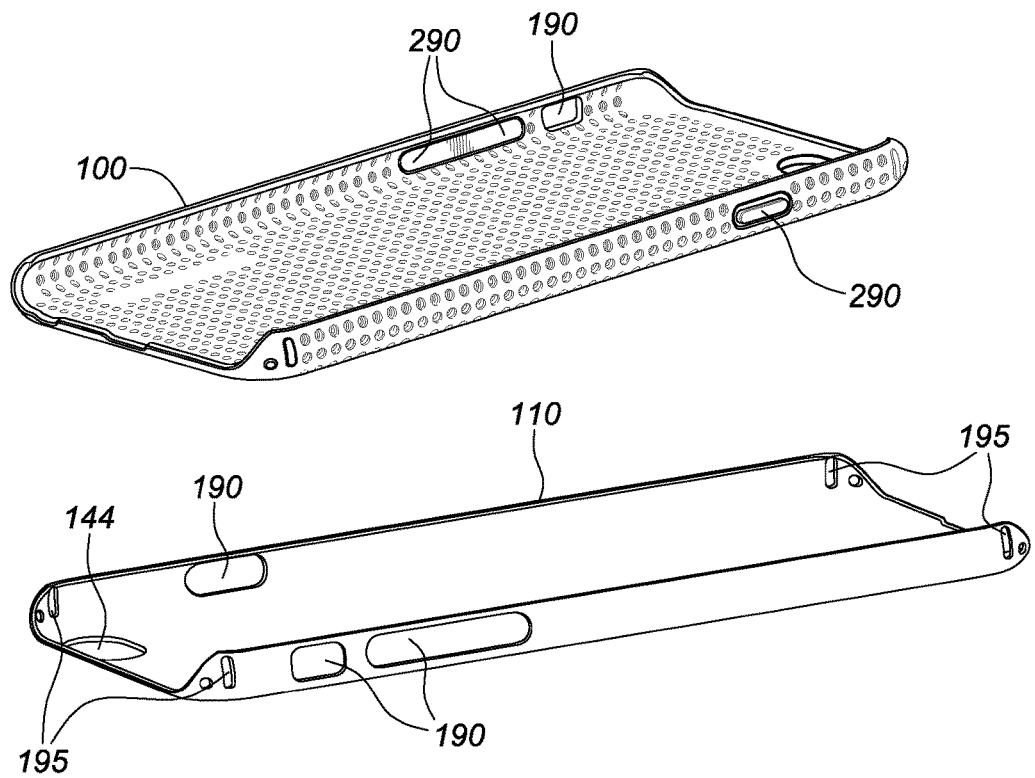
Figure 9B:
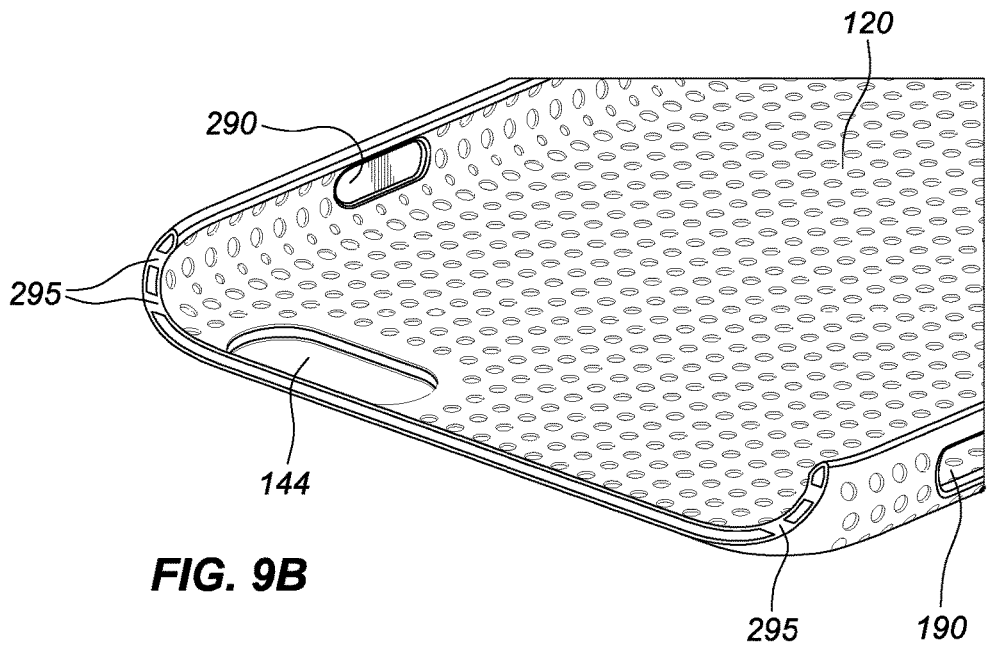

FIGS. 9A-9B are exploded and partial perspective views, respectively, of an embodiment of the case depicted in FIG. 1, wherein the corners of the inner layer of the case include three attachment openings all of which are generally uniformly shaped. The outer layer is molded through the attachment openings to provide greater durability and resistance to peeling.

Each drawing is generally to scale and hence relative dimensions of the various layers and features may be determined from the drawings.

DETAILED DESCRIPTION OF THE PREFERRED EMBODIMENT

As summarized above and illustrated in the drawings, disclosed herein are various aspects of a protective case for a mobile device capable of minimizing bulkiness and weight while providing an aesthetically appealing construction and maintaining a high level of protection. Many of those aspects are summarized above and illustrated in the drawings.

The case 100 is generally formed of a multilayered construction that includes an inner relatively rigid support layer or shell 110 that is wrapped or encased within a relatively less rigid and more elastic outer layer 120. The outer layer 120 is comprised of a first or internal side 230 and an opposing second or external side 240. The external side 240 and internal side 230 of the outer layer 120 extend to the perimeter of the relatively rigid shell 110 where they merge around the shell 110 form a unitary component.

The relatively rigid support layer 110 may be formed of polycarbonate, nylon fiber reinforced plastic, similarly rigid materials or a combination thereof. The relatively less rigid and more elastic outer layer or encasing 120 may be formed of a silicone compound or the like, such as neoprene or other synthetic rubbers.

As shown in the drawings, a camera opening 144 extends through both support layer 110 and outer layer 120, leaving a camera lens and camera flash of mobile device 10 unobstructed when mobile device 10 is received and retained in the protective case 10.

The inner rigid support layer 110 may include one or more apertures 190 that are configured to correspond with buttons or user controls 90 on the mobile device 10. The internal side 230 and external side 240 of outer layer or encasing 120 are configured to merge within the button/control apertures 190 to form buttons 290 therein. To the extent shown in the figures, some apertures 190 may remain uncovered by outer layer or encasing 120, allowing direct access to some user controls 90 of mobile device 10. The button/control apertures 190 are configured to permit movement of the button 290 within the aperture 190 when the user presses the button 290. The inner side 230 and outer side 240 of the relatively more elastic outer layer 120 are supported by the perimeter of the button aperture 190 of the rigid inner layer so as to effectuate a trampoline effect that is capable of biasing the button 290 back to equilibrium state and thereby generate a more dynamic button response.

The outer layer 120 may be perforated with one or more repeating patterns such as circular holes 234 (or other shapes) to allow visibility through the outer layer 120 to the inner more rigid shell layer 110. The pattern may enhance aesthetic appeal and the inner rigid support layer 110 may be formed of a different color than the outer layer 120. The perforated pattern of holes 234 may serve to decrease the weight of the case whiling saving material and providing enhanced aesthetic appeal.

The holes 234 may be comprised of any arrangement of shapes selected for example from a group consisting of a square, octagon, pentagon, rectangle, triangle, circle, hexagon and heptagon or combination thereof.

The perforated pattern of holes 234 through the outer layer 120 walls may be a repeating or non-repeating pattern comprised of any arrangement of patterns selected for example from a group consisting of a geometric patterns, natural patterns, and software design patterns, or combination thereof.

The inner and outer layers 110, 120 are configured to surround, receive and retain the mobile device 10 within a retention compartment defined by the case 100. The inner and outer layers 110, 120 are co-molded to one another using a dual injection molding process wherein the inner layer 110 is molded first and then the outer layer 120 is molded on top of the inner layer 110 so that the outer layer 120 extends beyond and around the outer edges of the inner layer 110 so as to effectively encase the inner layer 110 within the outer layer 120. The buttons section 290 formed by the outer layer 120 within the apertures 190 of the inner layer 110 are thus extensions of the internal 230 and external 240 sides of the outer layer 120 molded to both the outside and inside surfaces 130 140 of the inner layer 110 and thereby supported and attached around their perimeter to both opposing surfaces of the inner layer 110.

The outer layer 120 can be uniform in thickness in regions or throughout or have varying thickness in one or more regions. The thickness can for example be thinner at the edges of the holes 234 that form the see-through perforated pattern. This configuration may assist in keeping the holes 234 from catching on external objects and adding unnecessary stress to the adhesion between the inner and outer layers.

The corners of the case 100 near the perimeter areas may be configured to include regions where the outer layer 120 is laced or molded through attachment openings extending in the inner layer 110. As best illustrated in FIGS. 8-9, the inner layer 110 include a plurality of attachment openings 195 and a plurality of attachment connections 295 of the outer layer 120 molded there-through to effectively lace the internal and external sides 230, 240 of the outer shell 120 to one another through the inner shell 110. A stronger bond can thereby be formed between the inner and outer layers 110, 120 in those corner and perimeter regions, which may mitigate peeling of the outer layer 120 from the inner layer 110 in those areas and thereby provide greater durability.

Figure 8A:
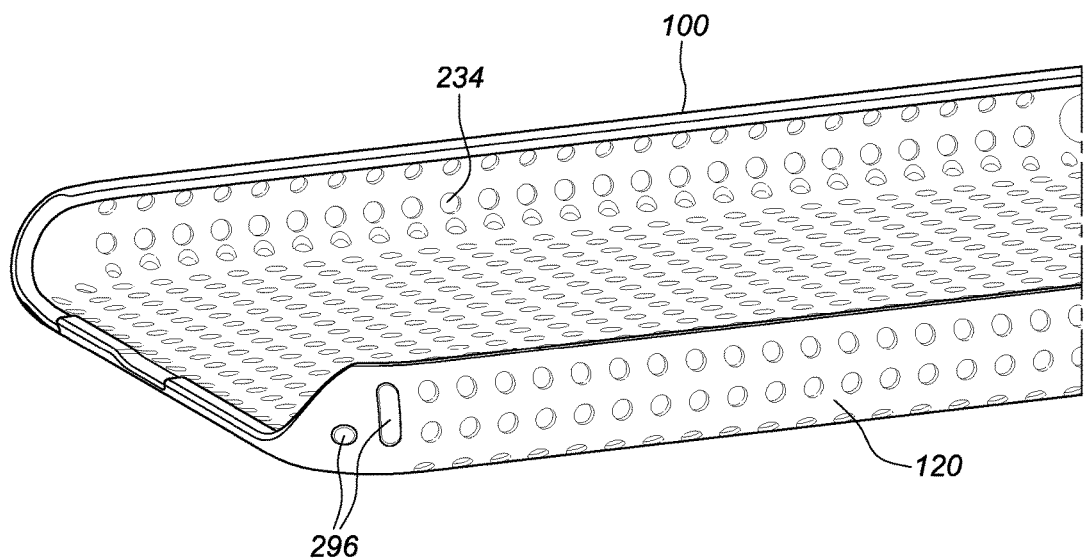
FIGS. 8A-8B are partial perspective and exploded views, respectively, of an embodiment of the case depicted in FIG.
Figure 8B:
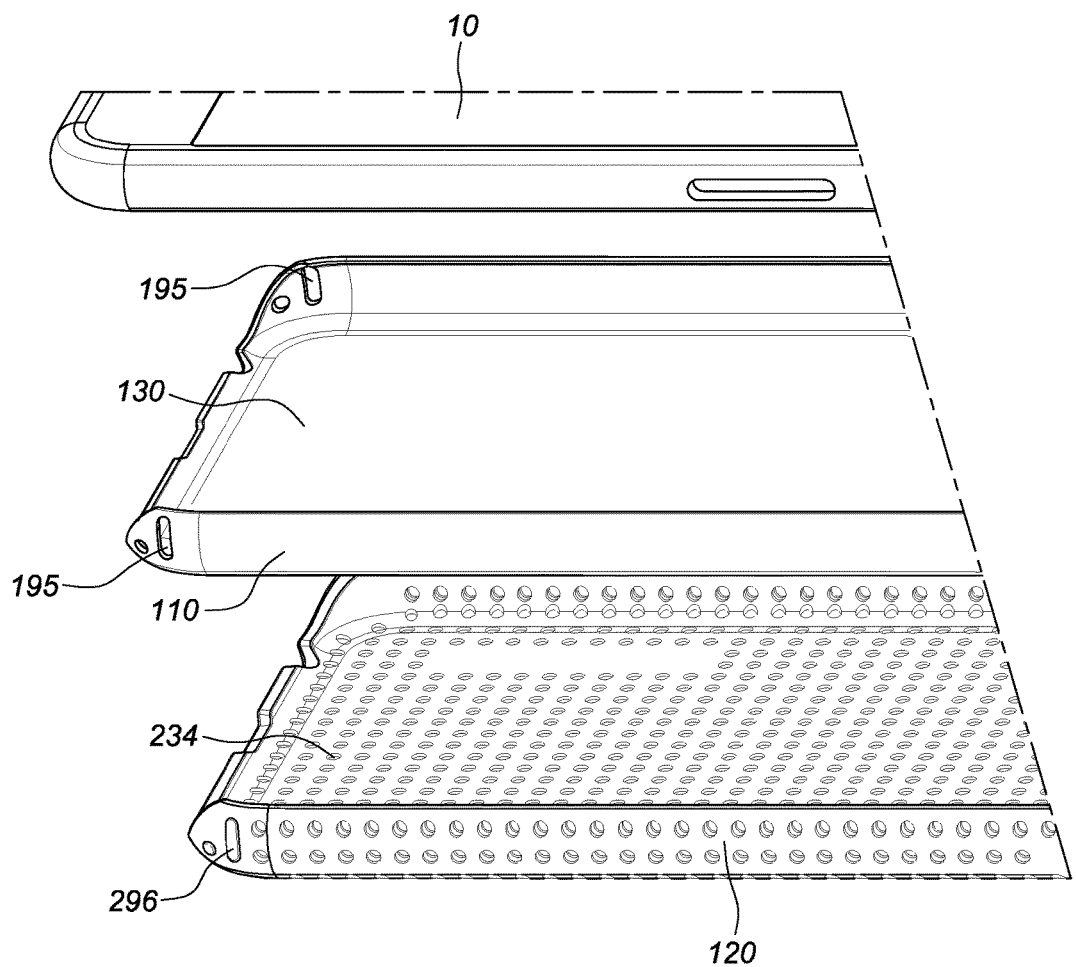

The attachment openings 195 may vary in size, shape, position, and number. For example, in one embodiment, each corner of the inner rigid layer 110 includes two attachment openings 195, one circular and one oblong in shape as shown in FIGS. 8A-8B. The mold can be configured so that the outer layer 120 at those openings 195 forms protrusions that function as corner bumpers 296. The oblong shaped attachment opening 195 and the corresponding corner protrusions or bumpers 296 may have the same or different dimensions. Thus, for example the bumpers 296 may exceed the size of the attachment opening 195 or may be sized to be smaller than the attachment opening 195. Moreover, the bumpers may not be formed symmetrically with or have the same shape of the underlying attachment opening 195. Indeed, the bumper may be much larger and have a different shape than the attachment opening and may be positioned off-center relative to the underlying attachment opening.

Moreover, multiple attachment openings may underlying a single bumper/protrusion. This single protrusion may be anchored to the opposing internal side of the outer layer at multiple attachment openings. By way of example, each corner of the inner rigid layer 110 may include three attachment openings 195 that are generally uniform in shape and are equally spaced apart from one another as shown in FIG. 9B. Three separate individual protrusion (such as those illustrated in FIG. 8) may be formed in the outer external side 240 of the outer layer 120 above each of those attachment openings or one or more of those protrusion may be merged into a large protrusion that is anchored through multiple attachment openings.

Also, it should be understood that bumpers 296 may extend not only externally but may extend internally into the mobile device cavity so as to provide additional cushioning to the device. When extending internally, the bumpers 296 may be less prominent in their dimensions so as to not undermine the fit of the case around the mobile device. Internal and/or external bumpers/protrusion 296 may be used in combination or alone at the corners or around the perimeter regions or other more internal regions of the case. When used internally, the rigid inner shell 110 region underlying and/or surrounding the internal bumper 296 may be formed thinner on the inner surface to allow additional room for the bumper while also minimizing fit distortion.

Methods of manufacturing a protective case 100 that includes one or more of the various foregoing aspects are also disclosed. Manufacturing steps may, for example, include:

(1) co-molding two distinct inner and outer layers within a mold to form an integrated protective case construct 100.

(2) molding the first inner layer 110 defined by first internal and external surfaces 130, 140 and dimensioned to cover at least a portion of the back face of the mobile device 10 and extend around at least a portion of the perimeter of the mobile device 10. The inner first layer 110 may be further molded to include one or more control apertures 190 dimensioned and positioned to allow access to control buttons or ports 90 on the mobile device 10 and one or more attachment openings 195 positioned, for example at the corners, perimeters and/or internal regions of the case 100.

(3) co-molding a second layer 120 over the internal and external surfaces 130, 140 of the inner layer 110 including around the perimeter regions of the inner layer 110, the second layer 120 being defined by corresponding inner 230 and outer 240 walls and dimensioned to cover one or more regions of the top, bottom, right and left sides of the mobile device 10 and regions of the back and front face of the device 10. The second layer may be further molded to include a pattern of holes 234 extending therethrough that define or form an arrangement of shapes selected for example from a group consisting of a square, octagon, pentagon, rectangle, triangle, circle, hexagon, heptagon or combination thereof. The pattern of holes 234 in the outer layer 120 being configured to visibly expose the underlying inner layer 110. The outer layer 120 may be molded through the attachment openings 195 at the corners to provide additional durability and resistance to peeling and may be molded to form protrusions or bumpers 296 at the corners or elsewhere on the case.

The various aspects relating to configuration, appearance and construction of each of the component layers described above or otherwise herein and/or illustrated in the drawings may be imparted by the molding process of the layer during one or more of the foregoing steps, or portions of any of the foregoing steps, in any combination without limitation.

Each of the foregoing and various aspects, together with those set forth in the claims and described in connection with the embodiments of the protective cases summarized above or otherwise disclosed herein including the drawings may be combined to form claims for a device, apparatus, system, method of manufacture, and/or use without limitation.

Although the various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while a number of variations of the various aspects have been shown and described in detail, other modifications, which are within their scope will be readily apparent to those of skill in the art based upon this disclosure.

It should be also understood that the scope this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A protective case for an electronic device, the protective case comprising:
    an inner shell constructed of a first material, the inner shell having a perimeter and opposing front and back sides, the shell perimeter including one or more apertures configured to correspond to one or more user control interfaces of the electronic device and a plurality of attachment openings; and
    an outer layer constructed of a second material with a lower hardness than the first material, the outer layer including a first outer layer bonded to the front side of the inner shell and a second outer layer bonded to the back side of the inner shell, the outer layer having a plurality of attachment connections constructed of the second material configured to bond the first outer layer to the second outer layer through the attachment openings,
    wherein the first outer layer and the second outer layer merge together at the perimeter of the inner shell and encase at least a portion of the inner shell in a continuous outer envelope overlay, and wherein the first outer layer and the second outer layer merge in one or more of the apertures and form button covers therein.

2. The protective case of claim 1, wherein the plurality of attachment openings are positioned near the corners of the shell perimeter.

3. The protective case of claim 1, wherein the plurality of attachment openings comprise one circular attachment opening and one oblong attachment opening.

4. The protective case of claim 1, wherein the plurality of attachment openings comprise three equally sized and equally spaced attachment openings.

5. The protective case of claim 1, wherein the outer layer is perforated with a plurality of holes that expose the inner shell.

6. The protective case of claim 1 further comprising bumpers on the outside of the second outer layer located directly over the attachment connections.

7. A protective case for an electronic device, the protective case comprising:
- an inner shell constructed of a first material, the inner shell having a front side, a back side and a perimeter, the perimeter including one or more apertures configured to correspond to one or more user control interfaces of the electronic device; and
- an outer layer constructed of a second material, the outer layer including a first outer layer bonded to the front side of the inner shell and a second outer layer bonded to the back side of the inner shell, the first outer layer and the second outer layer merging together at the perimeter of the inner shell and encasing at least a portion of the inner shell in a continuous outer shell, wherein the first outer layer and the second outer layer are configured to merge in one or more of the apertures and form button covers therein.

8. The protective case of claim 7, wherein the hardness of the first material is greater than the hardness of the second material.

9. The protective case of claim 7, wherein one or more of the apertures does not contain one or more of the button covers.

10. The protective case of claim 7, wherein the inner shell further comprises a plurality of attachment openings.

11. The protective case of claim 10, wherein the plurality of attachment openings are located near the corners of the shell perimeter.

12. The protective case of claim 10, wherein the plurality of attachment openings comprise one circular attachment opening and one oblong attachment opening.

13. The protective case of claim 10, wherein the plurality of attachment openings comprise three equally sized and equally spaced attachment openings.

14. The protective case of claim 10, wherein the outer layer further comprises a plurality of attachment connections constructed of the second material configured to bond the first outer layer to the second outer layer through the attachment openings.

15. The protective case of claim 14, further comprising bumpers on the outside of the second outer layer located directly over the attachment connections.

16. The protective case of claim 7, wherein the outer layer is perforated with a plurality of holes that expose the inner shell.

17. A method of manufacturing a protective case for an electronic device, the method comprising the steps of:
- providing a mold;
- injecting a first material into a first portion of the mold to form an inner shell, the inner shell having a perimeter, a front side and a back side, forming a plurality of attachment openings at the corners of the perimeter; and
- injecting a second material into a second portion of the mold to form an outer layer, the outer layer including a first outer layer bonded to the front side of the inner shell and a second outer layer bonded to the back side of the inner shell, wherein the first outer layer and the second outer layer merge together at a perimeter of the inner shell, encasing at least a portion of the inner shell in a continuous outer shell, and wherein a plurality of attachment connections are formed of the second material and configured to bond the first outer layer to the second outer layer through the attachment openings.

18. The method of claim 17, wherein the step of injecting a first material to form an inner shell includes forming one or more apertures in the inner shell configured to correspond to the user control interfaces.

19. The method of claim 17, wherein the step of injecting a second material to form an outer layer includes forming one or more button covers of the second material in the one or more apertures.

20. The method of claim 17, wherein the step of injecting a second material to form an outer layer includes forming bumpers from the second material on the outside of the second outer layer located directly over the attachment connections.

* * * * *